Aug. 18, 1942.  A. Z. MAMPLE  2,293,155
COAXIAL CABLE
Filed Aug. 7, 1939  6 Sheets-Sheet 1

INVENTOR
A. Z. MAMPLE
BY
ATTORNEY

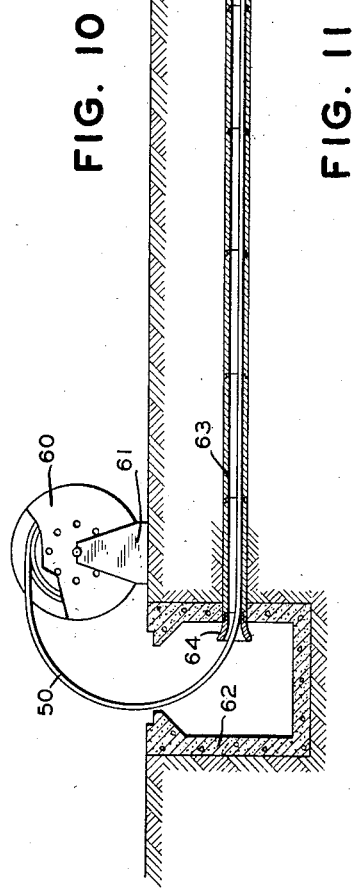
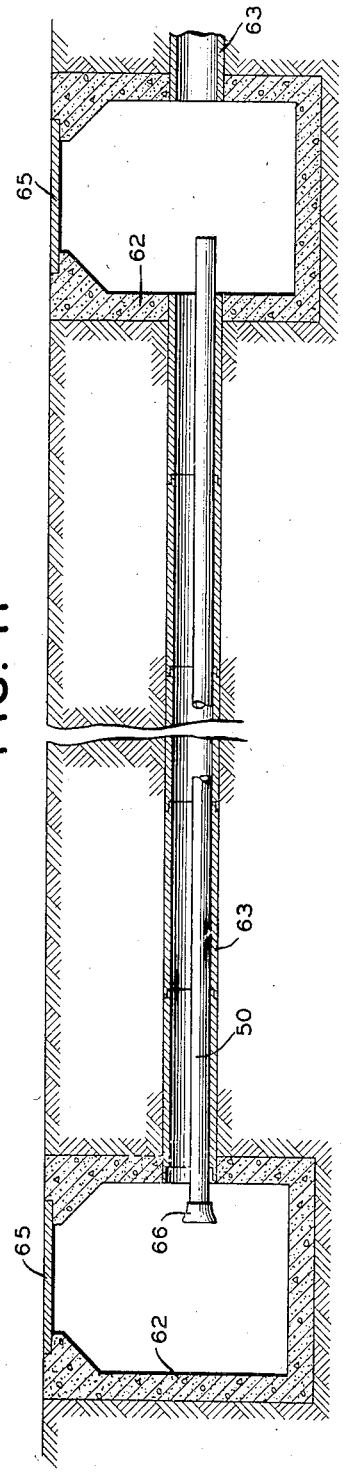
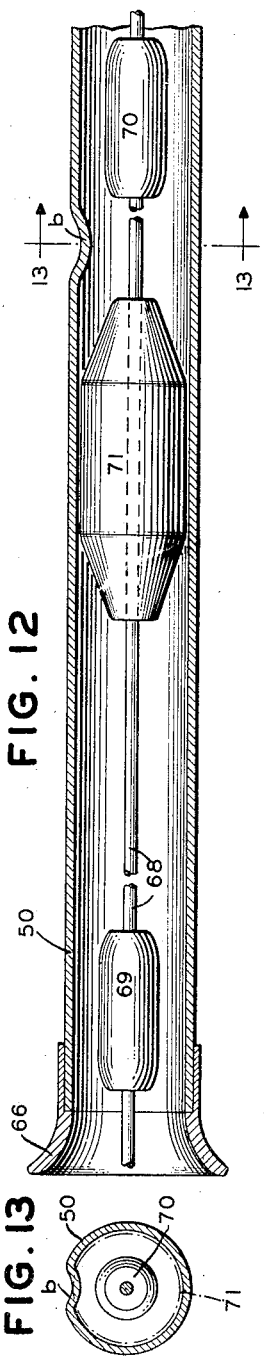
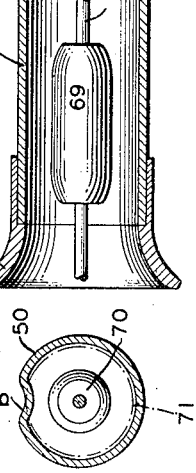

INVENTOR
A. Z. MAMPLE
BY
ATTORNEY

Aug. 18, 1942.  A. Z. MAMPLE  2,293,155
COAXIAL CABLE
Filed Aug. 7, 1939  6 Sheets-Sheet 4
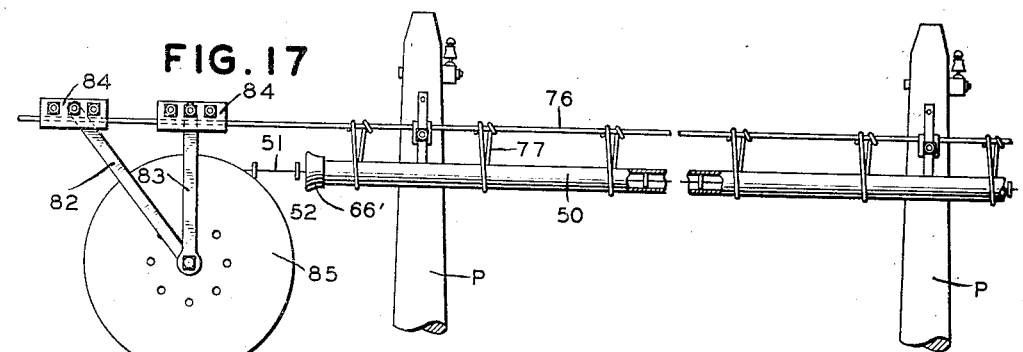
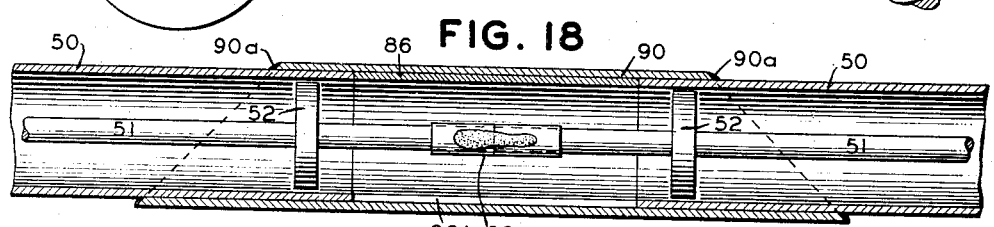
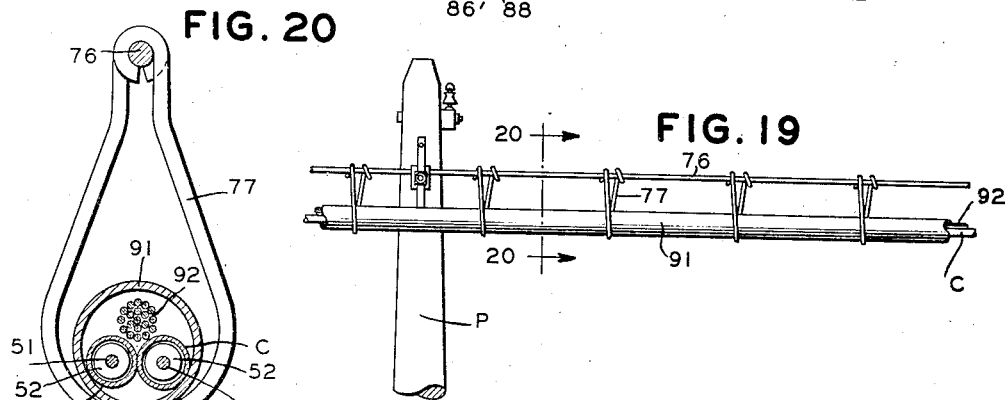
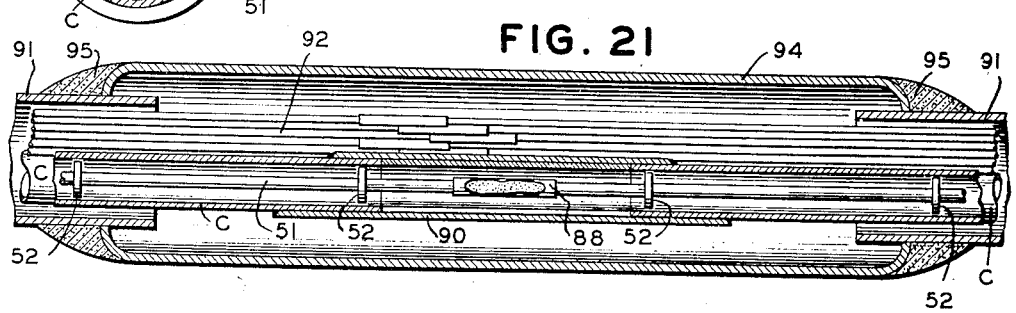
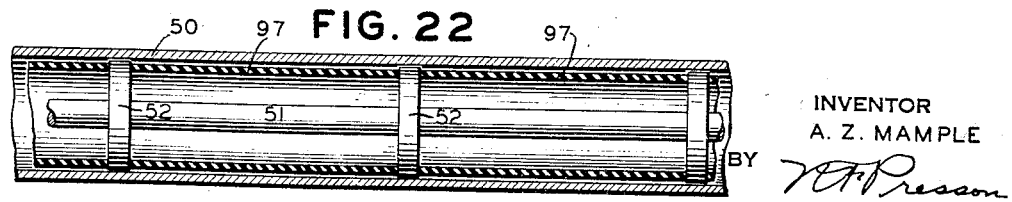
INVENTOR
A. Z. MAMPLE
BY
ATTORNEY Aug. 18, 1942.  A. Z. MAMPLE  2,293,155
COAXIAL CABLE
Filed Aug. 7, 1939    6 Sheets-Sheet 5

INVENTOR
A. Z. MAMPLE
BY
ATTORNEY

Patented Aug. 18, 1942

2,293,155

UNITED STATES PATENT OFFICE 2,293,155

COAXIAL CABLE

Adolph Z. Mample, Glen Rock, N. J., assignor to The Western Union Telegraph Company, New York, N. Y., a corporation of New York Application August 7, 1939, Serial No. 288,875

12 Claims. (Cl. 174—28)

This invention relates to a conducting system particularly adapted for the transmission of a wide band of frequencies well above the frequencies at present employed in carrier transmission and whose upper range may be in megacycles, and more particularly to an improved method of building or constructing a coaxial cable and to the improved cable constructed in accordance with such method.

The development of wide band transmission circuits has resulted in a form of circuit, generally referred to as the coaxial or concentric circuit, comprising an outer conducting tube which encloses a central conductor that is spaced from the outer tube by means of insulating discs. The high frequency transmission circuit is formed between the inner surface of the outer conductor and the outer surface of the inner conductor, the outer tubing serves both as a conductor and a shield.

In a coaxial cable system, if the two conductors be separated in so far as is possible by a dielectric consisting largely of air or other gaseous medium, the cable has a number of desirable characteristics. Its attenuation at all frequencies is quite low as compared with the corresponding attenuation of open wire lines and cable circuits such as are commonly employed for telephone and telegraph transmission. The coaxial cable may, therefore, be employed for the transmission of much wider bands of frequencies than is possible with types of transmission circuits heretofore used, and it also has the advantage of being substantially free from interference from neighboring conductor systems and in itself tends to produce but little interference into adjacent transmission circuits. In order to maintain the conductors in their relative concentric positions, it is necessary to provide the insulating washers above mentioned, but the presence of such washers increases the attenuation, and if the washers are spaced close together as has heretofore been found necessary in practice where the cylindrical conductors of the cable are of flexible construction, the amount of solid dielectric material per unit length of the cable may be increased to such an extent that the resultant increase in attenuation becomes highly undesirable.

It has heretofore been deemed necessary because of the problems of installation to provide a coaxial cable that could be rolled up on drums, hung on poles or pulled underground, and handled after the fashion of the conventional telephone and telegraph cables. The steps of manufacturing coaxial cable, reeling it on a cable reel, transporting it to the place of installation, unreeling, straightening out and pulling it into place, all subject the cable to various stresses such as tension, straightening, bending, compression and the like. Bending tends to make the tubular or cylindrical outer conductor become generally elliptical, placing the outer periphery in tension and the inner periphery in compression, while at the same time placing the inner conductor in tension, and this introduces a lack of symmetry into the coaxial system, and straightening the cable after having thus been bent introduces irregularities in the cable structure, particularly in the inner conductor, which substantially increase the attenuation of the circuit, makes the circuit more susceptible to external interference, and causes the values of the circuit to vary with movement of the cable such as in a wind. Also, any slight irregularity in the structure of the cable will make itself felt by a variation in its local characteristic impedance and cause reflection or echo effects and thus cause variation in the input impedance of the cable.

In an attempt to avoid lack of symmetry and irregularities in the structure of the cable, the art in practice has resorted to a very close spacing of the insulating washers, and since it was found impracticable, if not impossible, to draw the outer conductor over the washers when thus closely spaced, it has been the practice to form the outer conductor by winding filamentary or preformed strips in a long spiral around the spacing washers, and in some cases weaving the outer conductor around the washers. Forming the outer conductor in this manner enabled manufacture of such a cable, but it has its mechanical limitations because it may readily become elliptical when bent, and also has introduced electrical disadvantages. Filamentary or strip construction is not satisfactory electrically because effective shielding fundamentally involves three series of loops whose planes are mutually perpendicular to each other, each of which loops could be replaced by a sheet of metal to form a cube. Thus, in a shield for a conductor it involves a combination of closed loops in series whose axes run along the center of the conductor. It is evident that these loops should be uniform in resistance and of sufficiently low resistance to be an effective shield. In a filamentary spiral, spiral strip or woven outer conductor, the shielding loops must rely on the contact resistance of the filamentary or spiral strips to form closed low resistance loops. Nearly all metals which would be practicable for use as an outer conductor, such as copper, form films on the surface which cause high resistance contacts. For instance, copper joints comprising an inch or more of twisted conductors have been found to be as high as eight ohms even though the joint was in a cable and sealed and protected from atmospheric or corrosive gasses. Similarly it is known that the wires forming stranded cable often vary appreciably in resistance even when adjacent wires are measured. It is evident, therefore, that filamentary or strip construction of the outer conductor in which the component parts of the loop merely touch in the spiral do not provide loops which are uniformly low in resistance and therefore such construction does not provide the most effective shielding.

Another disadvantage of coaxial cables as heretofore proposed or employed is the excessively high cost of such cables, due principally to the involved methods of manufacturing and installing the cables, and also due to the necessity for close spacing of repeaters because of an undesirably high attenuation in the cable due to close spacing of the insulating washers, irregularities in the cable structure, and the like. For example, in a coaxial cable, 0.3″ in diameter, of a type heretofore proposed, there was a loss of approximately 5.6 decibels per mile at a frequency of one million cycles, and vacuum-tube amplifiers or repeaters were required at ten mile intervals. The ten mile spacing will contain a loss of approximately 56 decibels which approaches the maximum loss that can be tolerated since, in the transmission of intelligence by electrical signals, it is necessary to keep the signal level considerably higher than the noise level, and tube noise and other considerations limit the maximum loss to approximately the figure just given.

An object of the invention is an improved and practicable method of constructing or fabricating a coaxial cable in which the foregoing disadvantages are obviated or substantially minimized.

Another object of the invention is a coaxial cable that closely approximates in practice the perfect theoretical cable electrically and mechanically when the cable is installed in place.

Another object is to greatly reduce the cost of making and installing coaxial cable systems and also to enable the distance between adjacent amplifier or repeater stations to be appreciably increased.

Additional objects and advantages of the invention will be apparent from the following detailed description, taken in connection with the accompanying drawings, in which:

Fig. 10 illustrates one of the initial steps of making or fabricating a coaxial cable in accordance with the present invention, when employed as an underground cable;

Fig. 11 shows how the outer tubular conductor is prepared for the following steps in the method of fabricating the cable;

Fig. 12 is a view of a device employed to straighten out or remove any kinks or irregularities that may have been present in the outer tubular conductor;

Fig. 13 is a cross-sectional view taken along the line 13—13 of Fig. 12;

Fig. 17 shows the step of pulling the inner conductor and insulating washers into the outer conductor of the aerial cable;

Fig. 18 illustrates the method of splicing the outer and inner conductors of the system;

Fig. 19 shows one form of an aerial system comprising a plurality of coaxial cables;

Fig. 20 is a cross-sectional view taken along the line 20—20 of Fig. 19;

Fig. 21 shows a method of splicing the cable of Figs. 19 and 20;

Figure 23:
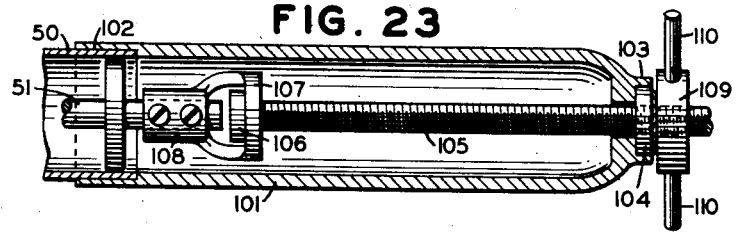
Figure 24:
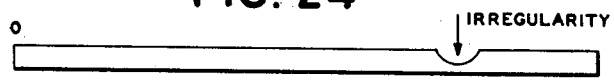
Figure 25:
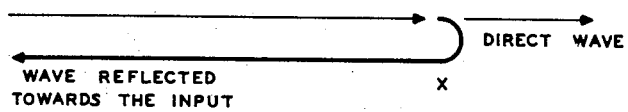
Figure 26:
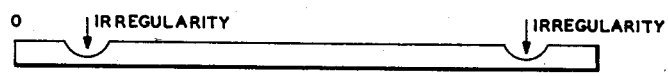
Figure 27:
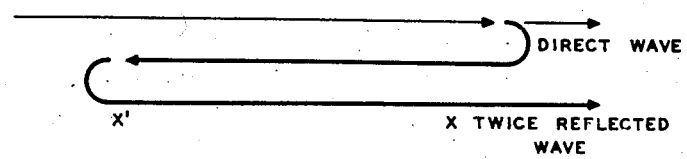
Figure 28:
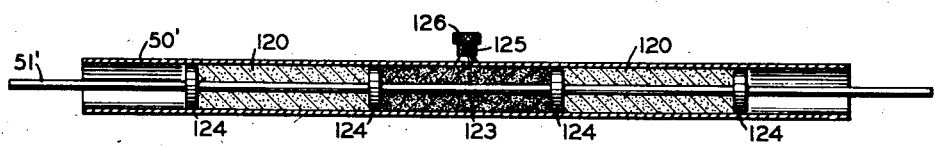
Figure 29:
Figure 30:
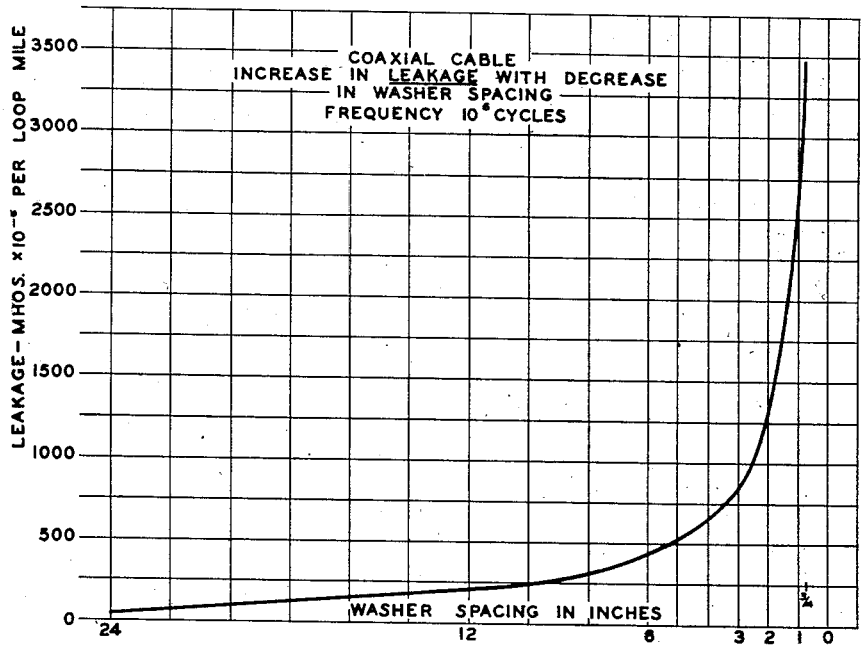
Figure 31:
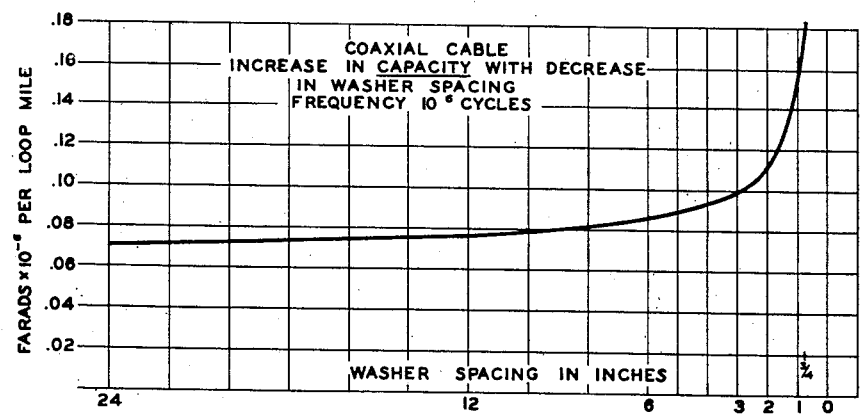
Figure 32:
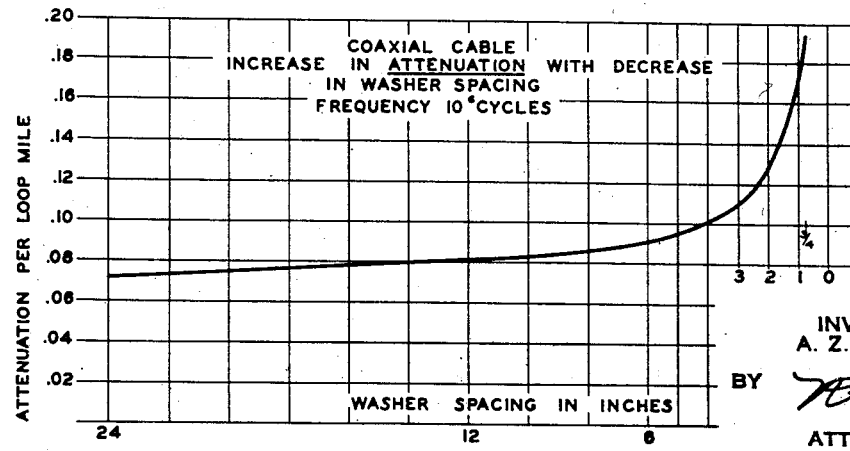

Fig. 22 discloses a modified form of means for securing the insulating washers in proper spaced relation longitudinally of the inner conductor;

Fig. 23 shows a device for straightening the inner conductor, after it has been pulled in place, to remove any kinks or irregularities therein;

Figs. 24 and 25 diagrammatically indicate an irregularity in a conductor of a coaxial cable, and the reflected wave resulting therefrom;

Figs. 26 and 27 diagrammatically indicate two irregularities in a conductor of a coaxial cable, and the double reflection caused thereby;

Fig. 28 illustrates a cable dam for use with the cable of the present invention;

Fig. 29 shows another form of means for securing the insulating washers to the inner conductor;

Fig. 30 shows graphically the increase in leakage in a coaxial cable with decrease in washer spacing;

Fig. 31 shows graphically the increase in capacity in a coaxial cable with decrease in washer spacing; and Fig. 32 illustrates graphically the increase in attenuation in a coaxial cable with decrease in washer spacing.

Figure 1:
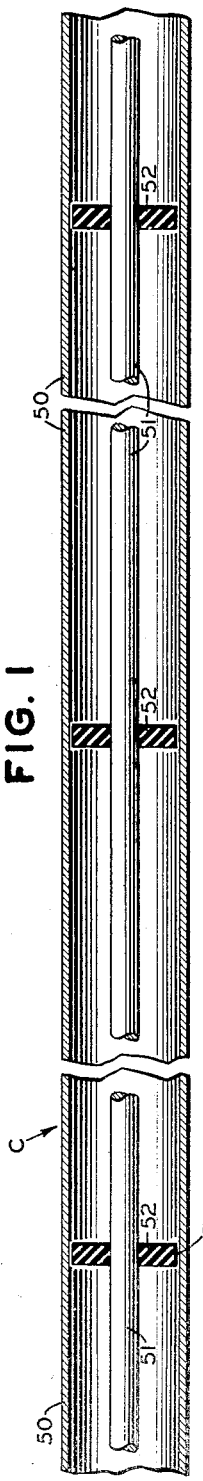
Fig. 1 is a longitudinal sectional view of a coaxial cable constructed in accordance with the present invention.

Referring particularly to Fig. 1 of the drawings, there is shown a coaxial cable C constructed in accordance with the present invention. The outer tube 50 may be formed from a piece of seamless metal tubing, such as the flexible soft drawn copper tubing commercially manufactured and used for water lines for refrigerators, and the like. One size of such tubing which is suitable for the cable of the present invention has an outside diameter of approximately 0.5 inch and an inside diameter of approximately 0.43 inch, although various other sizes may of course be employed. While generally manufactured in short lengths of forty to fifty feet, this tubing may be obtained from various tube mnufacturers in lengths of from five hundred to six hundred feet, and thus provide sections sufficiently long for the practicable construction of the cable, such lengths being adapted to reach between manholes in the case of underground cables and to reach a number of spans in the case of aerial cables supported on pole lines in the usual manner. This tubing is comparatively inexpensive and does not require any special procedure in its manufacture except that it is drawn into longer lengths than usual. The inner conductor 51 of the cable may be a copper wire such, for example, as a No. 9 B & S gauge wire, preferably soft drawn or medium hard drawn, which has an outside diameter of approximately 0.114 inch, such size in hard drawn wire being commonly employed for telegraph circuits carried on pole lines. This wire is also comparatively inexpensive and represents a well known commercial product obtainable from various wire manufacturers. The inner conductor is supported by and spaced from the outer conductor by means of thin insulating pieces, referred to hereinafter as washers, made of polystyrene, isolantite or other suitable low loss insulating material, the washers preferably being one-sixteenth of an inch thick. The spacing of the washers longitudinally of the cable may vary, depending upon the size of the coaxial cable and other factors, and in the illustrative embodiment disclosed may be spaced from four to eight inches apart.

Figure 2:
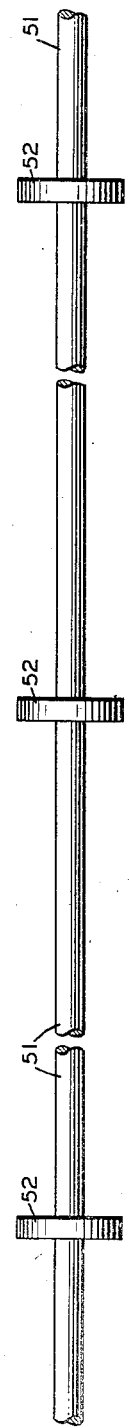
Fig. 2 is a view of the inner conductor and spacing washers prior to their insertion in the outer tubular conductor.

As shown in Fig. 2, the inner conductor 51 and washers 52 are assembled, the washers being maintained in proper spaced relation longitudinally of the conductor by being cemented thereto or by very small beaded portions 53, Fig. 29, formed on the wire 51, prior to the insertion of the inner conductor in the outer tube 50. If beaded portions, such as the portions 53 of Fig. 29, are employed they preferably are of the order of 0.005 inch, and thus are to small to be drawn to scale on the figure, and do not introduce irregularities in the structure of the conductor. When the inner conductor is thus formed, it may be reeled on a cable reel, preferably of large diameter, and transported to the place where the cable is to be built or fabricated. The outer tube 50 may similarly be wound on a cable reel of relatively large diameter and transported to the place where it is to be installed.

As set forth in the patent to Green No. 1,859,390, issued May 24, 1932, where the insulating washers that support the inner conductor are spaced a considerable distance apart and are themselves relatively thin, the amount of solid dielectric material present per unit of conductor length is so small as to produce substantially negative increase in attenuation over that which would be present if the entire dielectric space were gaseous. If, as stated in the patent, it is necessary for mechanical or other reasons to closely space the washers, as for example, where the inner and outer conductors are flexible, the resultant increase in attenuation may be so great as to render the system impractical as compared with former types of transmission systems.

In practice, however, because of mechanical or other reasons, it has heretofore been found necessary to provide very close spacing of the washers, as close as three-quarters of an inch in a cable which has recently been installed. This undesirably close spacing of the washers was required because otherwise when the outer conductor of a coaxial cable was subject to variations due to manufacture, and to reeling, unreeling, transporting, and the like, the conductors would develop irregularities or become asymmetrical. This will be appreciated from a consideration of Figs. 3 to 6 of the drawings, the outer tube being shown as fabricated from spirally laid metal strips. Bending of the cable due to manufacture, reeling, shipping, unreeling, straightening and installing the same, subjects a cable to various stresses such as tension, bending, etc. Bending tends to make the tubular outer conductor become elliptical, placing the outer periphery in tension and the inner periphery in compression, while at the same time placing the inner conductor in tension. This causes the inner conductor to form chords between adjacent insulating discs, as will be noted from Fig. 3, instead of maintaining its true central position with respect to the outer tubing. If the bending has been sufficient to bend the inner conductor as shown in Fig. 3, attempts to straighten the cable will not restore the position of the inner conductor and further movement of the cable tends to change the position of the inner conductor with relation to the outer tube.

Figure 3:
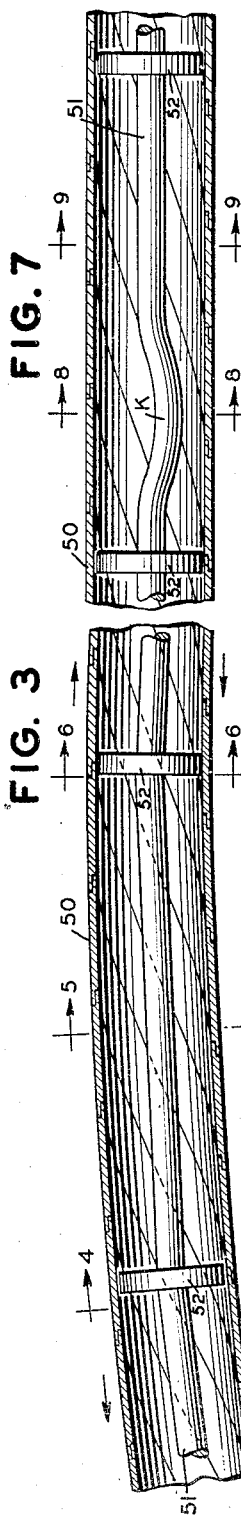
Fig. 3 illustrates how a lack in symmetry in a coaxial system is introduced when the cable is bent or deflected.
Figure 5:
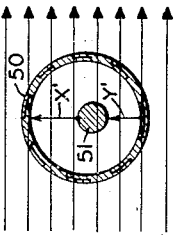
Fig. 5 is a cross-sectional view taken along the line 5—5 of Fig. 3, and illustrates the effect of an external field when the conductors of the cable are not symmetrically disposed.
Figure 4:
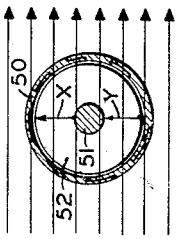
Fig. 4 is a cross-sectional view taken along the line 4—4 of Fig. 3, and illustrates how external disturbing fields perpendicular to the axis of the cable are neutralized when the coaxial system is symmetric.

Referring, for example, to Figs. 4 and 5, which are cross-sections of the cable of Fig. 3, the departure from a true concentric arrangement of the conductors causes the cable to be subject to distortion from external disturbing fields, such a field being indicated by the long parallel arrows in the figures. Fig. 4 is a cross section taken at a place where the inner conductor 51 is properly maintained in its central position with respect to the outer tube 50 by means of the insulating piece 52. Assuming that the external force produces a field as represented by the arrows, the lines of force cutting the two concentric conductors produce differences in potential between points of the two conductors, that is, the lines of force cutting the two conductors produce an electromotive force between the points and in the direction of having the value indicated by the arrow $x$, and these lines of force also produce an electromotive force between the points in the direction and having the value indicated by the arrow $y$. Since the same number of lines of force cut the two conductors on the opposite sides of the central conductor, however, induced potentials represented by the arrows $x$ and $y$ produce current flows which are equal and opposite to each other, so that a balance is obtained; thus, where the conducting system is symmetrical with respect to the cutting lines of force, all differences in potential produced between any other two points of the two conductors will be balanced by similar differences of potential introduced in corresponding points on the other side, and thus no interfering effects are caused by external fields.

When, however, the central conductor 51 is displaced with respect to the outer conductor 50, as indicated in Fig. 5, the lines of force cutting the two conductors produce unequal electromotive forces between the points in the direction and having the values indicated by the arrows $x'$ and $y'$, and the unequal induced potentials exert interfering effects on the conducting system.

Figure 6:
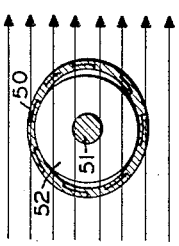
Fig. 6 is a cross-sectional view taken along the line 6—6 of Fig. 3, and illustrates how disturbing potentials are introduced into the system when the outer conductor becomes flattened as a result of having been bent.

Also, when the outer tube 50 becomes flattened at points, caused by bending due to manufacture, reeling, shipping, unreeling, and installing, this causes the outer conductor to become flattened on one side or elliptical, and causes the inner conductor to be brought closer to the inner surface of the outer conductor, and thus the system becomes asymmetrical, as indicated in Fig. 6. The nature of these faults varies the capacity of the cable and introduces variable induced potentials into the system, thus tending to destroy one of the principal advantages of coaxial cable systems over other systems. Any change in the symmetry of the coaxial system is also reflected in another phase of an important factor of the cable, namely, attenuation. This is due to the fact that the closer the inner conductor is to the outer conductor, the greater will be the attenuation due to capacity, and the chords formed by the inner conductor shown in Fig. 3 and the tendency of the outer conductor to become flattened on one side or elliptical, bring the inner conductor closer to the inner surface of the outer conductor, and the higher the capacity the greater the attenuation of the cable.

Figure 7:
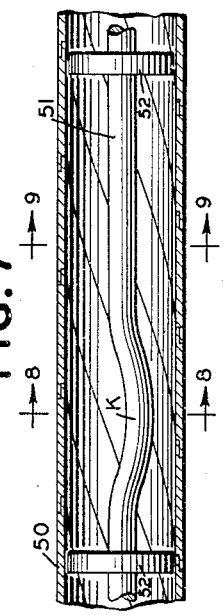
Fig. 7 illustrates how kinks or other irregularities are formed in the inner conductor when the cable is straightened after having been bent.
Figure 9:
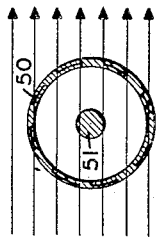
Fig. 9 is a cross-section taken along the line 9—9 of Fig. 7 and illustrates, by comparison with Fig. 8, the abruptness of the irregularity shown in Fig. 8.
Figure 8:
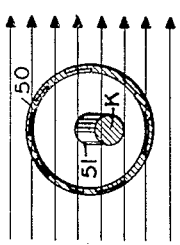
Fig. 8 is a cross-section taken along the line 8—8 of Fig. 7.

Figs. 7 and 8 illustrate how irregularities are introduced into the central conductor 51 when a coaxial cable is straightened after having been bent during manufacture and installation in accordance with prior methods. When the cable is bent, the inner conductor 51 was placed under tension and caused to form chords between adjacent insulating pieces, and when the outer tube is straightened, due to the fact that the inner conductor cannot readily slip through the various washers through which it passes because of the binding effect of the washers, it tends to bow or have kinks formed therein at various places along the cable, one of these kinks being indicated at $k$ in Fig. 7. The direction which the kink may take, of course, is not determinable, but in any event it causes irregularities in the inner conductor and results in reflection thus causing echo effects as hereinafter set forth. The relatively large displacement of the inner conductor, as shown in Figs. 7 and 8, results from the cumulative effect of the straightening of the various adjacent chords of the conductor. Fig. 8 illustrates, by way of comparison with Fig. 9, the extent of deflection of the central conductor from its true concentric position.

Figs. 30, 31 and 32 graphically indicate the increase in leakage, capacity and attenuation, respectively, caused by a decrease in washer spacing in a coaxial cable. The curves are plotted with reference to a coaxial cable having a 2½ inch outer tubular conductor and a ⅝ inch inner conductor employing ¼ inch isolantite spacers, at a frequency of one megacycle, although the same principles apply with coaxial cables of different sizes and with different frequencies.

Referring to Fig. 30, the graph illustrates the increase in leakage expressed in mhos $\times 10^{-6}$ per loop mile, with a reduction in washer spacing expressed in inches. It will be noted that as the washer spacing decreases, and particularly as the spacing becomes less than 2 inches, the leakage increases enormously, and with a washer spacing of ¾ of an inch, which has heretofore been considered necessary in practice particularly where the outer conductor is composed of a filamentary strip or woven, the leakage becomes excessively high.

Fig. 31 illustrates the increase of capacity, expressed in farads $\times 10^{-6}$ per loop mile, and shows the excessively high increase in the capacity of the cable with the close spacing between the washers heretofore found necessary in the construction of coaxial cables. Fig. 32 shows the increase in attenuation per mile of cable with close washer spacing. In each of the graphs referred to, it will be seen that if the washer spacing can be increased so that it is of the order of 4 inches or more, the leakage, capacity and resulting attenuation of the cable are reduced to a value that greatly improves the electrical characteristics of the cable.

Due to the high frequencies employed in coaxial cable systems, the effect of cable irregularities on the propagation of signals is of great importance. These irregularities may result from even slight variations in the cable structure and, as hereinbefore stated, may be introduced either during manufacture or installation. Initially, a slight irregularity in the structure of either the outer or inner conductor of the cable will make this apparent by variation in its local characteristic impedance and cause reflection as indicated diagrammatically in Figs. 24 and 25. There thus results a series of attenuated waves which are reflected and which, as shown in Fig. 25, return to the origin O of the cable, manifesting themselves by a complex echo and by a variation of the input impedance. A second effect, illustrated diagrammatically in Figs. 26 and 27, consists in a double reflection at two points of irregularity. Here a wave is produced and superimposed at the output side of the direct wave, giving rise to a prolongation of the signal, referred to as the signal tail or tailing of the signal. These irregularities in the cable structure cause loss of energy by reflection, whence an increase in the mean attenuation results and also distortion or interruption of the signals, which effects increase with the frequency and therefore become increasingly important at the higher frequencies at which coaxial systems are intended to be used.

Figs. 10 to 14 illustrate a method of building or fabricating an underground coaxial cable in accordance with the invention. Referring to Fig. 10, the preformed outer tubular conductor 50 is unwound from a special cable reel 60 mounted on trunnions 61 and is pulled through an underground cable duct 63 between adjacent manholes 62, a bell-mouthed guide member 64 being inserted into the duct to facilitate entry of the cable therein. Fig. 10 shows the tubular conductor 53 lying in place in the underground duct, the tube 53 having a bell-mouthed cap 65 temporarily inserted thereon to prevent bending or kinking of the end of the tube and also to facilitate further steps in the fabrication of the cable. After the tube 50 is pulled in as shown in the figure, any irregularities, such as indicated at $b$ in Figs. 12 and 13, are removed by pulling a three-ball hammer through the tube 50. The three-ball hammer comprises a middle ball or mandrel 71 having conical-shaped ends, the member being slidably mounted on a rod or wire 68, the member 71 being struck, when necessary, by the two end balls or hammers 69 and 70, which are fastened securely to the pull rod or wire 68. When the three-ball hammer comes in contact with an irregularity b, the rod or wire 68 and the balls 69 and 70 thereon are drawn back and forth by the installers, producing a striking action by the member 71 against the irregularity b which is thus hammered and smoothed out to reform the tubing. Where the tube is not deformed the mandrel may be passed through quite easily, but where it is deformed the mandrel will reform it, as when drawn in the factory, into a tube of true circular cross-section. The largest diameter of the member 71 is but a few thousandths of an inch less than the normal inside diameter of the tubing 50. After the three-ball hammer is thus worked through the tube 50 from one manhole to the next manhole, the inside of the inner diameter of the tube 50 will be uniform throughout the length thereof and all elliptical sections, buckles, dents, etc., in the tubing will have been removed. The tube 50 is now ready for the insertion of the inner conductor and spacing washers.

Figure 14:
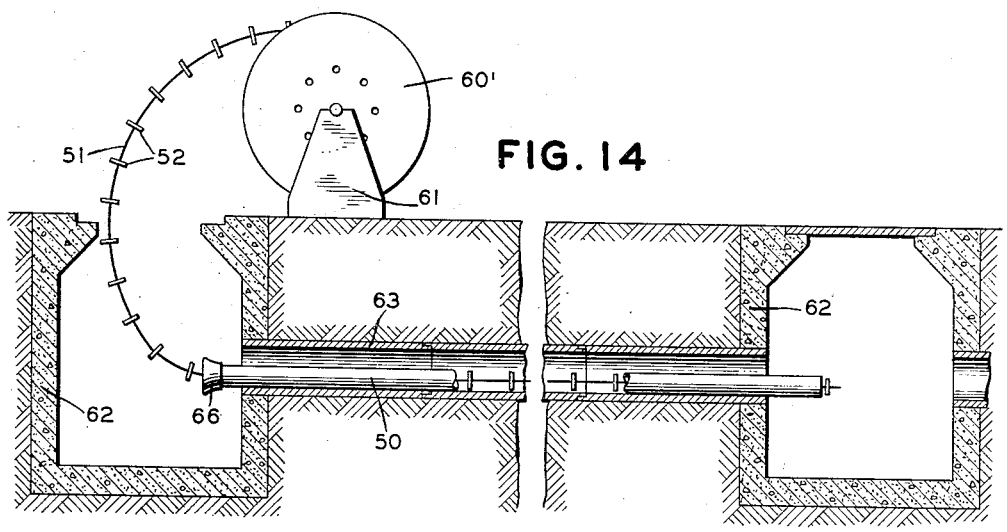
Fig. 14 illustrates the step of pulling in the central conductor and insulating washers through the outer conductor when employed as an underground cable.

Fig. 14 shows how the inner conductor 51 and the spacing washers or discs 52 are pulled into the outer tube 50. With a washer spacing of four inches, in a cable of the size hereinbefore stated, a pulling force of 20 lbs. per hundred feet of cable is necessary to overcome the friction between the insulating discs and the outer tubular conductor, and even though lengths of from 500 to 600 feet of the inner conductor are thus pulled in, the total pulling force required does not appreciably elongate the No. 9 copper wire comprising the inner conductor.

After the inner conductor has been pulled in through the tube extending between adjacent manholes, any irregularities in the wire 51 are removed by employing a suitable straightening device for placing the wire under the necessary tension, such a device being shown in Fig. 23 of the drawings. Preferably, the device comprises a cylindrical shell 101 having a shoulder portion 102 at its open end that engages the extending end of the tube 50. The closed end of the cylindrical member 101 has a flanged portion 103 in which is seated a circular bearing member 104 that carries a set of ball bearings against which a rotatable member 109 bears. The member 109 is interiorly screw-threaded to receive the threaded bolt 105, and as the member 109 is rotated by means of the handles 110, it causes the threaded rod 105 to move longitudinally with respect to the inner conductor 51. At the inner end of the threaded rod 105 there is secured a collar 106 which engages a member 107, the latter member being secured to a clamp 108, having screws or other suitable means for clamping the device to the inner conductor 51. As the member 109 is rotated in a direction to cause the threaded rod 105 to move from left to right, as viewed in Fig. 23, this stretches the inner conductor 51 to the degree necessary to remove any kinks or irregularities which may have been introduced into the wire. The other end of the wire 51 may previously have been anchored, in any suitable manner, at the preceding manhole, or in the case of long sections of cable a second straightening device may be employed at the preceding manhole. Inasmuch as the inner diameter of the outer tube 50 now represents a true circle throughout the length thereof, and the member 51 is straight and true, and the washers 52 are perfectly concentric with an outer diameter of only a few thousandths of an inch less than the inner diameter of the outer conductor 50, this causes the inner conductor to be uniaxial with respect to the outer conductor and thus result in a perfect symmetrical coaxial cable.

As above stated, the outer conductor 50 is a perfect circular unit conductor, and it will be apparent that with no unequal tension on the inner conductor 51 with relation to the outer conductor, there are no forces tending to form chords from washer to washer or to pull the inner conductor out of alignment with the axis of the outer conductor. The symmetrical cable thus formed will thus permit of no induced potentials, and no increases or variations in attenuation due to capacity because of unequal spacing of the inner conductor with relation to the outer conductor, and eliminates the undesirable echo effects. It will further be evident that the perfect condition of the completed coaxial cable obtained does not require extra close spacing of the insulating washers since the method by which the cable has thus been built in situ has eliminated the necessity for such close spacing. As above explained, this results in further reduction of attenuation due to the lower capacity and leakage conductance of the washers.

It will further be noted that the outer conductor consists of a series of completely closed loops uniformly low in resistance whose axes coincide throughout with the axis of the cable. Therefore the cable is better shielded in that it provides a uniformly low resistance return conductor. These improvements not only provide a cable with lower and non-variable attenuation characteristics, but also result in a cable with a very low noise level. Because of the more efficient shielding it also results in a complete absence of coupling of external fields. The cable may therefore be attenuated to a lower level, thereby permitting a wider spacing of repeaters. The construction of the cable by the method herein disclosed, made as it is largely from commercially available materials, has the added advantage that the resulting cable costs only a fraction (approximately twenty per cent) of the coaxial cables heretofore proposed or installed.

Figure 15:
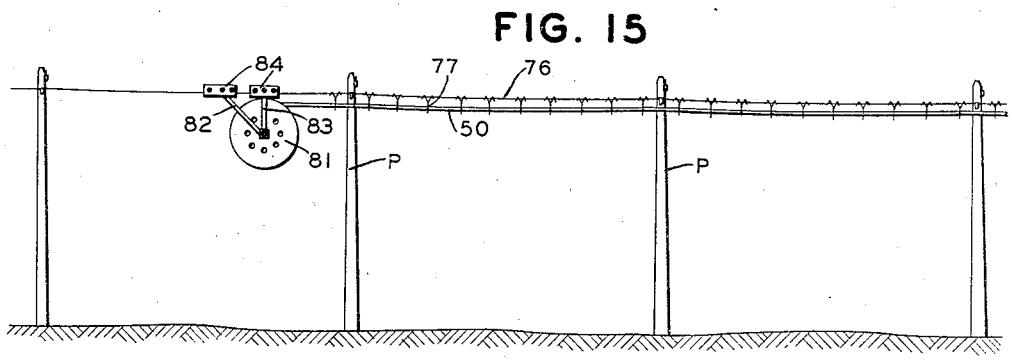
Fig. 15 illustrates the step of pulling in the outer conductor in the method of making or fabricating the cable when employed as an aerial cable.
Figure 16:
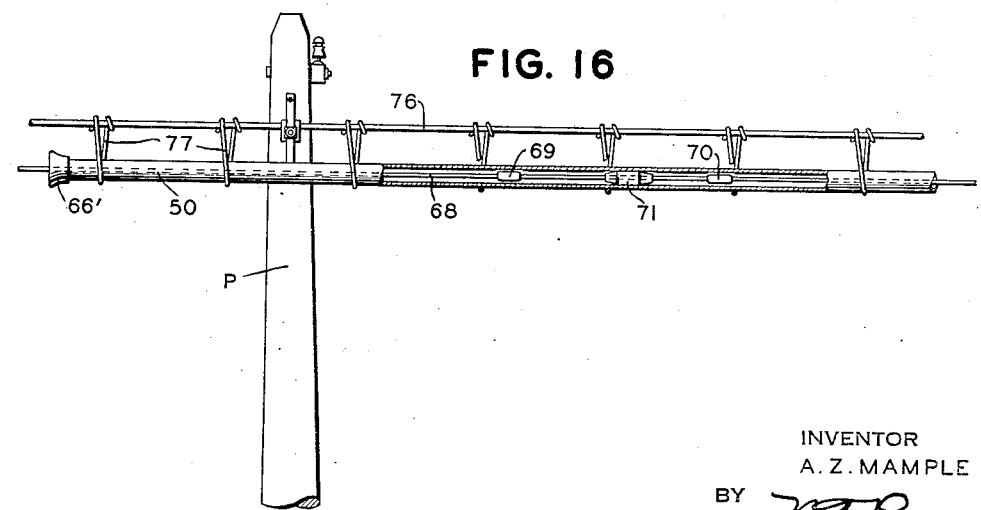
Fig. 16 illustrates the step of removing kinks or irregularities from the outer tubular conductor of the aerial cable.

Figs. 15 to 17 illustrate the invention as applied to an aerial coaxial cable. Referring to Fig. 15, there is shown a pole line p carrying a cable supporting strand or messenger 76, to which are secured cable hangers 77 through which the outer conductor 50 is pulled. The cable may conveniently be pulled from a special lightweight reel 81 rotatably supported by memmbers 82 and 83 on each side of the reel, the latter members being readily secured by means of clamps 84 to the supporting messenger 76. Since the cable reel 81 and copper tubing thereon are relatively light in weight the reel and cable thereon may easily be hoisted by a line into position for mounting on the supporting messenger 76. After the tube 50 has been pulled in place, a bell-mouthed guide 66', Fig. 16, is secured to one end thereof and the three-ball hammer 68 to 71 is pulled through the tube to remove any kinks, bends or irregularities in the outer conductor, in the manner hereinbefore described with reference to the underground cable. The inner conductor 51 and washers 52 may be carried on a special lightweight reel 85 supported from the cable messenger 76. After the inner conductor and insulating washers are pulled into the tube 50, the conductor 51 is stretched in the manner hereinbefore described in connection with the underground cable, to remove any kinks, bends or irregularities in the conductor. The result is that the aerial coaxial cable is truly symmetrical and exhibits the same desirable characteristics as the underground cable referred to above.

The various sections of the coaxial cable, whether aerial or underground, may be spliced together in any suitable manner. One method of doing this is illustrated in Fig. 18 of the drawings, in which the ends of the central conductors 51 of adjacent sections are caused to abut each other, these ends being both mechanically and electrically joined by means of a thin connector sleeve 88 which has an opening therein for the purpose of soldering the sleeve and conductors 51 together as indicated by the stippled area in the figure. After the inner conductors 51 have thus been joined together, a copper sleeve 86, which is longitudinally split at 86', is opened up sufficiently to slip the sleeve in place so that it abuts the two ends of the outer tubes 50, after which a connector sleeve 90 is soldered at 90a to the tubes 50, and thus the inner surface of the outer tube is smooth. As shown by dotted lines in the figure, the ends of the sleeve 90 are cut at an angle to cause the solder to flow in between the sleeve and adjoining tubes 50, thereby to provide a moisture-proof and gas-proof joint.

An important advantage in the foregoing construction is that the outer copper tubing 50 is moisture-proof and gas-proof and therefore it is not necessary to provide an outer sheath of lead or the like to prevent the entrance of moisture or loss of gas, as is required when strip, filamentary or woven conductors are employed for a concentric cable. The copper tubing, with the inner conductor and insulating washers therein, may be carried in underground cable ducts or in aerial cable hangers of standard construction, generally in the manner of the conventional lead cables employed for telegraph and telephone work. Two or more coaxial cables in accordance with the present invention may be laid side by side in ducts or in cable hangers without substantial interference between their respective circuits.

If desired, where signal or repeater power feed circuits are employed, an outer sheath may be used; this may be readily done as indicated in Figs. 19 and 20, in which an outer sheath 91 of lead or other suitable material is employed for enclosing a pair of coaxial cables C and also conventional communication or power feed conductors 92, the outer sheath 91 affording the necessary protection for the conductors 92, the sheath being suspended in cable hangers in the case of an aerial system or laid in ducts in the case of an underground system. The various sections of the coaxial cables shown in Figs. 19 and 20 may be spliced generally in the manner disclosed in Fig. 18, the conductors 92 being spliced in conventional manner. The outer sheath 91 may be spliced by means of a sleeve 94 of suitable material having wiped joints 95 of tin and lead at its ends.

Fig. 22 illustrates a modified form of means for maintaining the correct spacing between the washers 52 both when the inner conductor and washers are pulled into the outer tube 50 and also for maintaining these positions in service. As shown, there are provided short pieces of tubing 97 of polystyrene, isolantite, or other suitable low loss insulating material, the outer diameter of each of the sleeves being sufficiently less than the inner diameter of the tube 50 to enable the inner conductor assembly readily to be pulled into the outer tube. The length of the sleeves or spacers 97 conform to the desired spacing between adjacent washers.

The present invention enables the use of an outer conductor of seamless flexible tubing of copper or other suitable metal and thus no seams are required in the outer tube. Also by reason of the fact that all irregularities are removed from the inner surface of the outer conductor and from the inner conductor, the washer spacing may be greatly increased over that heretofore found necessary in the construction of coaxial cables. The considerable increase in washer spacing facilitates the building or fabricating of the present cable since there is less friction between the washers and the outer tube when the inner conductor and washers are pulled in place, whereas in the construction of coaxial cables heretofore, it was necessary because of the spiral or filamentary construction of the outer tube to closely space the insulating washers, as close as 3/4 of an inch in practice, thereby appreciably increasing the capacity, leakage and attenuation characteristics of the cable. As above set forth, the greater the spacing between adjacent washers the better the electric characteristic of the cable, but in practice the art has heretofore been forced to go to a very close spacing of washers because of mechanical or other reasons. The present invention, therefore, in its broader aspect, relates to a practicable method of fabricating a flexible coaxial cable in which the desired increase in spacing between the washers is obtainable, and which exhibits and retains electric characteristics in service such that the performance of the cable closely approximates that of a theoretical coaxial system.

Furthermore, as the signal frequency is increased the increase in attenuation in cables in which close washer spacing is required increases very rapidly; for example, in such a cable to be used for television, which has to transmit frequencies of the order of four or five megacycles and higher, the attenuation may increase to a value which makes the use of the cable impracticable. By the use of a flexible solid inner conductor, as in applicant's cable, there is less likelihood of bending or kinking of the conductor, and there is no possibility of collapse of the inner conductor as there is when a cylindrical tubular inner conductor is employed, and the cost of the cable is decreased by reason of the fact that an ordinary soft drawn or medium hard wire may be employed.

While the washer spacing has heretofore been referred to as of the order of from four to eight inches, it will be understood that if a smaller washer spacing is desirable, for example, a three inch spacing, this can readily be obtained, and conversely the washer spacing may be considerably greater than eight inches, depending upon the size of the cable, the nature of the inner conductor and other factors. Also, while a small solid conductor preferably is employed in the cable of the present invention, it will be understood that a flexible hollow tubing or other flexible conductor may be used, although in general it will be found preferable to employ the solid conductor because of its mechanical strength and rigidity, and also because of the lower cost since tubular conductors of small sizes require special steps in the manufacture thereof. As above stated, the outer tube preferably is composed of soft drawn copper and the inner conductor is composed of soft drawn or medium hard drawn copper wire, the resistance of which is less than that of hard drawn copper, but it will be appreciated that hard drawn copper wire may be employed for the inner conductor and that materials other than soft drawn copper may be employed for the flexible outer tubing.

In order to prevent the entrance of moisture because of an injury to or fault in the outer tube 50, the tube is filled with a suitable inert gas, such as nitrogen, which is maintained under pressure higher than atmospheric pressure. The gas also forms an ideal dielectric between the conductors of the cable and further provides means for making tests in the outer conductor in the outer tube 50, and for giving an alarm to indicate the presence of an injury or fault. The gas may be introduced into the cable by means of valve connections generally in the manner disclosed in my Patent No. 1,998,766, issued April 23, 1935, or in any other suitable manner.

When gas is maintained under pressure in the cable, it is desirable or necessary that dams be provided for sectionalizing and terminating the cables. Such dams are used in connection with testing for defects in the sheath and splices of the cable. One form of dam which has the desired efficiency against the passage of gas, moisture or dampness, and which is self-sealing with respect to any cracks or interstices in the dam material, is disclosed and claimed in my Patent No. 1,769,524, issued July 1, 1930, a modified form of such a dam being shown in Fig. 28 of the drawings of this application. The dam, which is a trisectional dam, is made by making two dams 120 of a relatively hard material, such as a mineral wax having a melting point of the order of 120° F., these dams being located about four inches apart. Intermediate the dam sections 120 is a dam 123 of a semi-liquid material which is inserted in the tube 50' at such a low temperature that it does not melt the hard material of the zones 120, the dams preferably being separated by washers 124 of low loss insulating material. The material 123 may comprise a mixture of a high melting point mineral wax and rosin oil or may be of a similar highly viscous material. The wax or hard material 120 used is not in itself resilient and has a tendency to contract after application and to crack under normal temperatures, and the semi-liquid material 123 counteracts the deficiencies of the hard material in this respect. Thus, when compressed gas is applied to the dam at one end and leaks through cracks or interstices in the nearest hard section 120, the pressure thus produced on the semi-liquid material in the midsection 123 seals any minute openings or interstices in the other hard section and prevents the gas from passing through the dam. Pressure due to gas on the other side of the dam will act to seal any interstices in the opposite direction. In practice, for the low pressures usually employed, which run from atmospheric pressure to 20 pounds per square inch, both hard sections are effectively sealed and remain so. The dam may be made by pouring a quantity of hard wax in one end of the tube 50' to form one of the end sections 120, the end washer 124 of the section having previously been secured to the inner conductor 51'.

After the wax of the end section has hardened, a second washer 124 is slipped in place, and the semi-liquid material 123 is poured in the open end of the tube 50'. The next washer 124 is inserted and the second hard section 120 poured, after which the last washer is inserted. As stated in my foregoing patent, if due to aging or rupture at high pressure, the dam should leak slightly, it may be resealed by reheating the tube 50' at the center of the dam and adding to the middle section a small amount of the semi-liquid material which is inserted by a pressure gun connected to the dam inlet 125 that normally is sealed by a cap 126 screw-threaded onto the inlet. The dam may be spliced to adjacent sections of the cable in the manner described hereinbefore for splicing cable sections together.

Various arrangements and signal systems for locating defects in the gas-filled cable may be employed, one of these systems being disclosed and claimed in my Patent No. 2,071,698, issued February 23, 1937. Another system which may be employed is disclosed in the copending application of A. Z. Mample and D. P. Dickie, Serial No. 154,888, filed July 21, 1937 and issued as Patent No. 2,219,262, for a System of detecting and locating defects in cable sheaths.

For brevity in the claims the expression "installation" is employed in a generic sense to define the cable assembly in its permanent location or in some other location such that it may be transported and installed in its permanent location without substantially affecting deleteriously the desired condition or characteristics thereof recited in the claims; similarly, the expression "in situ" is employed in a generic sense to define the permanent location of the cable or some other location such that the cable may be transported and installed in its permanent location without substantially affecting deleteriously the desired condition or characteristics thereof recited in the claims; the expression "flexible" applied to the inner and outer conductor elements of the cable means that these elements, as opposed to rigid, are sufficiently non-rigid as to be capable of being coiled or placed on reels for storage, transportation or other purposes; and the expression "long lengths" employed means lengths sufficiently long for the practicable construction of the cable, for example, lengths adapted to reach between manholes in the case of underground cable construction or between poles in the case of aerial pole line construction.

It will be evident to those skilled in the art to which the present invention pertains, that the invention is not limited to the specific methods and structures shown and described, and that various changes and modifications therein may be made, and I therefore do not desire to be limited to the precise method and structure shown and described except in accordance with the appended claims.

What is claimed is:

1. The method of making a high frequency coaxial cable installation having a flexible seamless outer tube comprising a solid conducting wall that encloses a flexible inner central conductor spaced from the outer tube by insulating pieces through which the central conductor passes, which comprises securing to the central conductor in predetermined spaced relation longitudinally of the conductor insulator pieces of slightly less diameter than the inner diameter of the outer tube for centrally positioning said conductor within said tube, applying a force to the inner wall of said outer tube to smooth out any irregularities present in the inner surface of said outer tube in a manner to cause said inner surface to have a true circular configuration, and subsequently drawing the central conductor and insulator pieces secured thereto through the outer tube until the inner conductor and spacing pieces are properly positioned within the outer tube.

2. The method of making a high frequency coaxial cable installation having a flexible seamless outer tube comprising a solid conducting wall that encloses a flexible inner central conductor spaced from the outer tube by insulating pieces through which the central conductor passes, which comprises securing to the central conductor in predetermined spaced relation longitudinally of the conductor insulator pieces of slightly less diameter than the inner diameter of the outer tube for centrally positioning said conductor within said tube, smoothing out any irregularities present in the inner surface of said outer tube in a manner to cause said inner surface to have a true circular configuration, subsequently drawing the central conductor and insulator pieces secured thereto through the outer tube until the inner conductor and spacing pieces are properly positioned within the outer tube, subsequently applying a stretching force to the inner conductor until any irregularities present therein are smoothed out and then removing said stretching force.

3. The method of making a high frequency coaxial cable having a flexible outer conducting tube that encloses a flexible inner central conductor spaced from the outer tube by insulating pieces through which the central conductor passes, which comprises securing to the central conductor in predetermined spaced relation longitudinally of the conductor insulator pieces of slightly less diameter than the inner diameter of the outer tube for centrally positioning said conductor within said tube, installing in situ a section of the outer tube and smoothing out any irregularities present in the inner surface of said outer tube in a manner to cause said inner surface to have a true circular configuration, and subsequently drawing the central conductor and insulator pieces secured thereto through said section of the outer tube until the inner conductor and spacing pieces are properly positioned within the outer tube.

4. The method of making a high frequency coaxial cable having a flexible outer conducting tube that encloses a flexible inner central conductor spaced from the outer tube by insulating pieces through which the central conductor passes, which comprises securing to the central conductor in predetermined spaced relation longitudinally of the conductor insulator pieces of slightly less diameter than the inner diameter of the outer tube for centrally positioning said conductor within said tube, installing in situ a section of the outer tube, smoothing out any irregularities present in the inner surface of said section of the outer tube when thus installed in a manner to cause the inner surface to have a true circular configuration, drawing the central conductor and insulator pieces secured thereto through said section of the outer tube until the inner conductor and spacing pieces are properly positioned within the outer tube, and then stretching the inner conductor until any irregularities present are smoothed out.

5. In the art of making a high frequency coaxial cable having a flexible outer conducting tubing that encloses a flexible inner central conductor spaced from the outer tubing by insulator pieces through which the central conductor passes, the method of enabling substantial increase in the distance between adjacent insulator pieces to improve the electrical characteristics of the cable and obviating displacement of or irregularities in the cable conductors which when present seriously impair the desired electrical characteristics of the cable, said method comprising the steps of installing lengths of the flexible outer tubing in place where the completed cable is to lie and in such manner that adjoining lengths can be spliced together to form a continuous cable, subsequently removing from the inner surfaces of said lengths of tubing substantially all bends, kinks and irregularities so that said inner surfaces have a smooth circular configuration of uniform diameter throughout the respective lengths of tubing, preparing lengths of the flexible inner conductor and securing to said lengths in predetermined spaced relation longitudinally thereof low loss insulator pieces of slightly less diameter than the inner diameter of said lengths of flexible tubing, pulling the lengths of the inner conductor and insulator pieces secured thereto into the installed lengths, respectively, of the flexible tubing subsequent to the said removal therefrom of bends, kinks, and irregularities and in such manner that adjoining lengths of the inner conductor can be spliced together to form a continuous conductor, then stretching each of the lengths of inner conductor thus installed to remove substantially all bends, kinks and irregularities therefrom and cause the lengths of inner conductor to be centrally positioned at all places with respect to the lengths of tubing in which they lie, splicing the ends of the adjoining lengths of inner conductor together to form a continuous inner conductor, and splicing the ends of the adjoining lengths of tubing together so as to form a continuous outer tubing.

6. The method of making a high frequency coaxial cable having a flexible outer conducting tubing that encloses a flexible inner central conductor centrally spaced from the outer tubing by insulating pieces through which the central conductor passes, which comprises installing long lengths of flexible seamless outer tubing in place where the cable is to lie, removing from the tubing when thus installed, substantially all bends, kinks and other irregularities therein by hammering out the inner surface of the tubing at the points where such irregularities occur, preparing the central conductor by securing thereto in predetermined spaced relation longitudinally of the conductor insulator pieces of slightly less diameter than the inner diameter of the outer tubing, drawing long lengths of the central conductor and insulator pieces secured thereto into said lengths, respectively, of the outer conducting tubing subsequent to the said removal therefrom of bends, kinks and other irregularities, until the lengths of inner conductor and spacing pieces are properly positioned within the lengths of outer tubing, applying a sufficient pulling force to the ends of the lengths of inner conductor positioned within the lengths of tubing to pull bends and kinks out of the conductor and cause the same to be concentric throughout its length with respect to the flexible outer tubing, and splicing together the adjoining ends of the lengths of inner conductor and the adjoining ends of the lengths of outer seamless tubing, respectively, in such manner as to substantially avoid introducing irregularities in the coaxial conductors.

7. A high frequency coaxial cable installation comprising a preformed outer conducting tubing that forms one of the conductors of the coaxial circuit, said tubing being substantially free of bends, kinks and irregularities of a character which would cause signal distortion in the coaxial circuit and having a smooth inner circular configuration of uniform diameter substantially throughout the length thereof, said condition having been obtained by passage of a shaping device through said tubing, an inner conductor installed within said tubing, insulator pieces centrally supporting said inner conductor within the outer tubing, said inner conductor being substantially free of bends, kinks and irregularities of a character which would cause signal distortion in the coaxial circuit and spaced equally from the inner surface of the tubing throughout substantially the entire length thereof, said condition having been obtained by a tensional force applied to the inner conductor after its installation in said outer tubing.

8. A high frequency coaxial cable installation comprising a flexible, preformed outer conducting tubing that forms one of the conductors of the coaxial circuit, said tubing being substantially free of bends, kinks and irregularities of a character which would cause signal distortion in the coaxial circuit and having a smooth inner circular configuration of uniform diameter substantially throughout the length thereof, said condition having been obtained by passage of a shaping device through said tubing, a flexible inner conductor installed within said tubing, insulator pieces centrally supporting said inner conductor within the outer tubing, said inner conductor being substantially free of bends, kinks and irregularities of a character which would cause signal distortion in the coaxial circuit and spaced equally from the inner surface of the tubing throughout substantially the entire length thereof, said condition having been obtained by a tensional force applied to the inner conductor after its installation in said outer tubing.

9. A high frequency coaxial cable installation comprising a flexible, seamless copper tubing that forms one of the conductors of the coaxial circuit, said tubing being substantially free of bends, kinks and irregularities of a character which would cause signal distortion in the coaxial circuit and having a smooth inner circular configuration of uniform diameter substantially throughout the length thereof, said condition having been obtained by passage of a shaping device through said tubing, a flexible, inner copper conductor installed within said tubing, insulator pieces centrally supporting said inner conductor within the outer tubing, said inner conductor being substantially free of bends, kinks, and irregularities of a character which would case signal distortion in the coaxial circuit and spaced equally from the inner surface of the tubing throughout substantially the entire length thereof, said condition having been obtained by a tensional force applied to the inner conductor after its installation in said outer tubing.

10. A high frequency coaxial cable installation comprising a flexible, preformed outer conducting tubing that forms one of the conductors of the coaxial circuit, said tubing being substantially free of bends, kinks and irregularities of a character which would cause signal distortion in the coaxial circuit and having a smooth inner circular configuration of uniform diameter substantially throughout the length thereof, said condition having been obtained by passage of a shaping device through said tubing, a flexible inner conductor installed within said tubing, insulator pieces centrally supporting said inner conductor within the outer tubing, said inner conductor being substantially free of bends, kinks and irregularities of a character which would cause signal distortion in the coaxial circuit and spaced equally from the inner surface of the tubing throughout substantially the entire length thereof, said condition having been obtained by a tensional force applied to the inner conductor after its installation in said outer tubing, said insulator pieces being spaced from each other a distance of at least approximately three inches to reduce the attenuation of the coaxial circuit.

11. A high frequency coaxial cable installation comprising long lengths of a flexible, seamless copper tubing that forms one of the conductors of the coaxial circuit, an inner conductor centrally positioned within said tubing, said tubing providing circular conducting loops of low uniform electrical resistance disposed at right angles to the axis of said inner conductor thereby shielding the coaxial circuit from disturbing fields, and insulator pieces secured to and supporting said inner conductor concentric with said tubing.

12. The method of making a high frequency moisture proof and gas-tight coaxial communication cable installation, which comprises utilizing flexible, seamless metallic tubing having a solid conducting wall as the outer conductor of the cable, utilizing a flexible metallic conductor as the inner conductor of the cable, securing to said inner conductor in predetermined spaced relation longitudinally of the conductor insulator pieces of slightly less overall dimension than the inner diameter of said tubing for centrally positioning the inner conductor within the tubing, smoothing out any irregularities present in the inner surface of said tubing by applying a force to the tubing in a manner to cause said inner surface to have a substantially true circular configuration, drawing the central conductor and insulator pieces secured thereto through said tubing until the inner conductor and spacing pieces are properly positioned within the tubing, applying a force to the inner conductor to stretch the same, after the said insulator pieces have been secured thereto, until any substantial irregularities present in the conductor are smoothed out and then removing the stretching force from said inner conductor.

ADOLPH Z. MAMPLE.